R. E. HELLMUND.
SYSTEM OF CONTROL.
APPLICATION FILED APR. 18, 1917.

1,358,735.

Patented Nov. 16, 1920.
3 SHEETS—SHEET 2.

WITNESSES:
Ed Plinke.
W. R. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,358,735.  Specification of Letters Patent.  Patented Nov. 16, 1920.

Application filed April 18, 1917. Serial No. 162,907.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to systems embodying a plurality of induction motors or other driving units for hauling a common load.

One difficulty in operating a locomotive propelled by a plurality of induction motors or other driving units consists in maintaining an even distribution of electrical load among the several motors, under accelerating or regenerating conditions, and, at the same time, also preventing the occurrence of a general overload upon the locomotive. Various presumptive load-balancing arrangements of the prior art tend to aggravate the difficulty when one set of locomotive wheels begins to "slip," whereby the load on the corresponding motor is reduced and the remaining motors are more heavily loaded.

The object of my present invention is to provide, in a system of the above-indicated character, means for automatically fixing or adjusting the total load upon a plurality of driving units and other means for automatically and independently balancing the load distribution between the several units, irrespective of total load conditions.

More specifically stated, it is one object of my invention to provide a relay device for automatically counter-balancing the total driving-unit load against a selected value of supply-circuit voltage and other relay devices for counter-balancing the individual driving-unit load against the proportionate motor load, whereby each driving unit continuously performs the intended share of work.

My invention may best be understood by reference to the accompanying drawings, wherein.

Figures 1, 2:
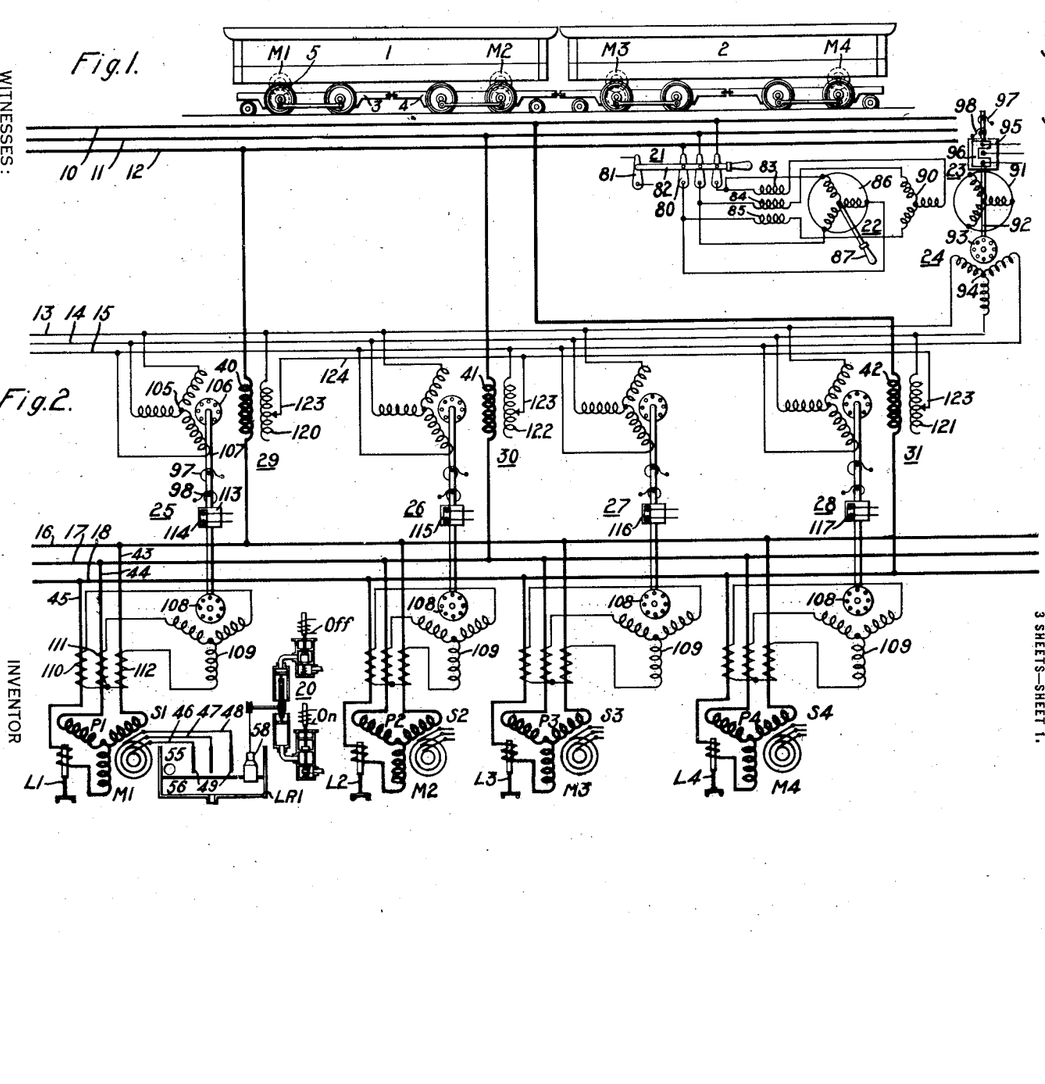
Figure 1 is a simplified elevational view of a two-unit locomotive embodying a system of my present invention.
Fig. 2 is a diagrammatic view of the main or essential circuit connections to be employed in accordance with one form of my invention.

Referring to Fig. 1 of the drawings, the locomotive illustrated comprises two similar half-units 1 and 2 which are respectively provided with pairs of driving induction motors M1 and M2, and M3 and M4, and a pair of articulated trucks 3 and 4 each of which is provided with any suitable type of driving mechanism 5 for transmitting the mechanical energy of the corresponding driving motor to the associated vehicle wheels. While I have shown four electric motors located upon as many trucks in a double-unit locomotive, it will be understood that any other number or type of driving units may readily be utilized in connection with my present invention.

The system shown in Fig. 2 comprises a plurality of main three-phase supply-circuit conductors 10, 11 and 12; a plurality of auxiliary train-line conductors 13, 14 and 15 and of main bus-bar or train-line conductors 16, 17 and 18; a plurality of the driving units M1 to M4, inclusive, in this case constituting induction motors respectively having three-phase primary stator windings P1, P2, P3 and P4 and secondary rotor windings S1, S2, S3 and S4; a plurality of resistance-varying devices, here shown as liquid rheostats LR1, etc., provided with an operating mechanism 20 for varying the secondary-circuit resistance of the corresponding induction motor; a plurality of limit switches L1 to L4, inclusive, of a familiar type, that are associated with the respective primary motor windings for a purpose to be set forth; a line switch 21 of any suitable type; a master controller or regulator 22 of the well-known induction-regulator type; a master relay device comprising an induction motor 23 that is energized from the master controller 22 and a mechanically-joined oppositely-acting induction motor 24 that is energized from the main motors, as hereinafter set forth in detail; a plurality of other relay devices 25 to 28, inclusive, that are electrically associated with the several motors and operating mechanisms therefor, for the purpose of individually balancing the motor loads, as subsequently described; and a plurality of transformers 29, 30 and 31 that are associated with the last-mentioned relay devices and also with the master-relay device, in a manner to be set forth.

It will be understood that the main supply-circuit conductors 10, 11 and 12 may be energized from any suitable source, such as a three-phase transmission line or a single-phase transmission line, in conjunction with a phase converter of a familiar type.

For the sake of simplicity and clearness, only a single liquid rheostat LR1 and its operating mechanism 20 are illustrated in Fig. 2, but it will be understood that corresponding apparatus is actually associated with each of the secondary induction motor windings S1 to S4, inclusive, in the system of Fig. 2 and also in the subsequently described system of Fig. 4.

The main supply-circuit conductors 12, 11 and 10 are respectively connected, through the primary windings 40, 41 and 42 of the transformers 29, 30 and 31, to the main bus-bars 16, 17 and 18, whence circuit is completed to the terminals of the primary induction-motor windings, through conductors 43, 44 and 45, respectively.

Figure 6:
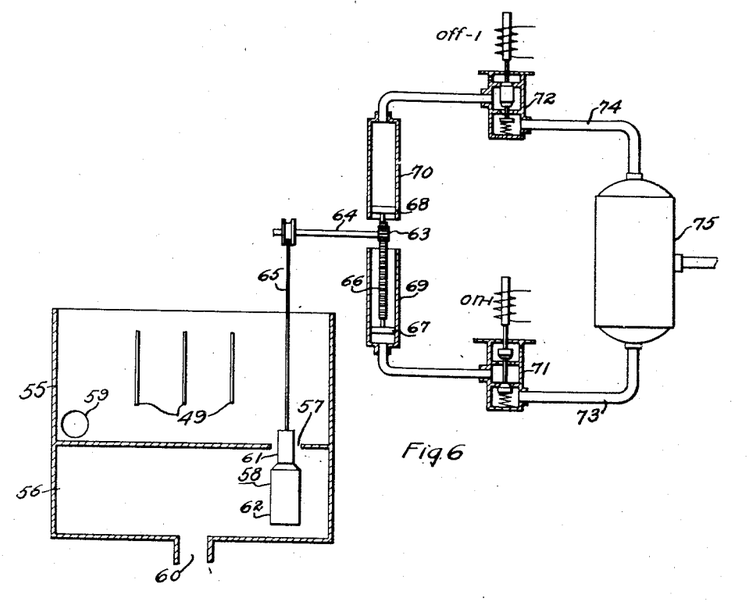
Fig. 6 is an enlarged diagrammatic view, chiefly in section, of portions of the governing apparatus that is illustrated in Fig. 2.

The terminals of each secondary induction-motor winding, such as winding S1, are connected through conductors 46, 47 and 48 to the respective electrodes 49 of the liquid rheostat LR1, which is illustrated on a larger scale in Fig. 6. The valve and the operating mechanism are shown in their uppermost and active positions in Fig. 1 and in their lowermost or normal positions in Fig. 6. The rheostat may be of any familiar type and is here shown as comprising a main tank or electrode-containing compartment 55, a bottom reservoir 56 that communicates with the tank 55 through an opening 57 with which is associated a movable hollow valve 58 for the purpose of determining the liquid level in the electrode-containing compartment; an inlet 59 to the tank 55 and an outlet 60 from the reservoir 56, a continuous circulation of electrolyte preferably being maintained through the agency of a suitable pump (not shown), for example.

The rheostat valve 58 is provided with an upper cylindrical portion 61 of smaller diameter than the surrounding opening 57, whereby the initial flow of electrolyte from the inlet passes through the opening 57 around the valve 58 to the reservoir 56. As soon as the lower cylindrical portion 62, which has a diameter substantially equal to that of the tank opening 57, is raised into engagement with the sides of the opening, the liquid level in the tank 55 immediately rises to the top of the valve 58 and overflows through the hollow valve to the reservoir 56. Thus, by raising and lowering the valve 58 through the agency of the operating mechanism 20, as about to be described, the liquid level in the electrode-containing compartment is correspondingly varied, whereby the secondary-circuit resistance of the allied induction motor is likewise changed to produce suitable accelerating or regenerative conditions in the motor.

The operating mechanism 20 is of a familiar electrically-controlled, pneumatically-actuated type and comprises a pinion 63 that is rigidly secured to a pulley shaft 64 which is attached to the rheostat valve 58 by a suitable rope or cable 65. The pinion 63 meshes with a vertically movable rack member 66, the opposite ends of which constitute pistons 67 and 68 that travel within appropriate operating cylinders 69 and 70. A normally closed valve 71 is associated with the outer end of the cylinder 69, and a normally open valve 72 communicates with the outer end of the other cylinder 70. Fluid pressure may be admitted to the valves 71 and 72 through pipes or passages 73 and 74 from any suitable source, as a tank 75. The valves 71 and 72 are respectively provided with actuating coils On—1 and Off—1 which are governed in a manner to be described in connection with Fig. 3.

The mechanical operation of the mechanism just described, without regard to the electrical connections effected thereby, may be set forth as follows: Since the valve 72 is normally open to admit fluid pressure to the cylinder 70, the mechanism is normally biased to the illustrated position, which corresponds to the inoperative condition of the liquid rheostat. Upon concurrent energization of the actuating coils On—1 and Off—1, fluid-pressure conditions in the mechanism are reversed, that is, pressure is admitted to the cylinder 69 and is exhausted from the other cylinder 70, whereby an upward movement of the pistons 67 and 68 ensues. To arrest such movement at any time, it is merely necessary to deënergize the Off—1 coil, whereupon fluid-pressure conditions in the apparatus are immediately balanced to effect a positive and reliable stoppage of the mechanism.

To produce a return movement of the operating device, the actuating coils are both deënergized, whereby fluid-pressure conditions revert to the original unbalanced state, and the desired movement is effected.

Figure 3:
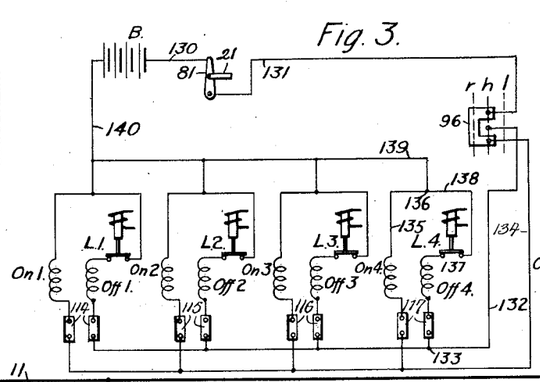
Fig. 3 is a diagrammatic view of a portion of an auxiliary governing system for manipulating certain circuits that are shown in Fig. 2.

As previously stated, the other unillustrated liquid rheostats are also provided with similar operating mechanisms, and, to distinguish the various actuating coils, such coils have been designated in Fig. 3 as On—2, Off—2, On—3, Off—3, and On—4 and Off—4, the numerals corresponding to those employed in denoting the several induction motors M1 to M4, inclusive.

It will be understood that various necessary circuit switches have been omitted from Fig. 2 in order to render the illustration as simple and clear as possible, and only the circuit connections that are essential in the employment of my present invention are shown.

The line switch 21 is provided with a plurality of blades 80 for connecting the master controller 22 to the supply-circuit conductors 10, 11 and 12, and an auxiliary switch blade 81 that is utilized for a purpose to be described in connection with Fig. 3 is also mechanically associated with the operating handle 82 of the switch.

The master controller or induction regulator 22 may be of any well-known type and is here shown as comprising a plurality of stationary primary coils 83, 84 and 85, which are connected to the respective blades of the line switch 21, and a movable wound rotor 86, the position of which may be adjusted by means of an operating handle 87.

The primary winding 90 of the auxiliary induction motor 23, comprising a part of the master relay device, has its three-phase windings respectively connected in series relation with the primary stator windings 83, 84 and 85 of the induction regulator 22, and a suitable rotor winding 91 for the induction motor 23 is mounted upon a shaft 92 which also carries a differentially-energized and oppositely-acting rotor 93 of the induction motor 24, the three-phase primary winding 94 of which is connected to the auxiliary train-line conductors 13, 14 and 15. The master relay device shaft 92 also carries an auxiliary drum 95, upon which is mounted a contact segment 96 that completes an auxiliary circuit, to be described in connection with Fig. 3, when the relay device occupies a certain position. For the purpose of normally maintaining the relay device in the middle position shown, a plurality of suitable centering springs 97 and 98, or the like, are attached to the shaft 92.

The relay devices 25 to 28, inclusive, are identical and, consequently, only the device 25 need be described in detail. The relay device 25 comprises a primary stator winding 105 that is connected to the auxiliary train-line conductors 13, 14 and 15 and a squirrel-cage rotor 106 having a supporting shaft 107 upon which is also mounted a second squirrel-cage rotor 108 that is differentially energized from a primary stator winding 109 to oppose the action of the rotor 106. A plurality of series transformer windings 110, 111, and 112 are connected in series relation with the respective phase windings 109, such series transformers being energized in accordance with the currents traversing the primary stator windings of the main induction motor M1, whereby the torque exerted by the squirrel-cage rotor 108 is proportional to the current in the main-motor windings. A small drum controller 113, or its equivalent, is also carried by the relay device shaft 107 to effect the insertion of a contact member 114 in a certain auxiliary circuit, as described in connection with Fig. 3, when the relay device occupies the position shown. The centering springs 97 and 98 are also again preferably provided.

The remaining relay devices 26, 27 and 28 are similarly connected in circuit relative to the other main motors and are respectively provided with auxiliary contact members 115, 116 and 117 for performing functions similar to that of contact member 114 of the relay device 25. The auxiliary train-line conductors 13, 14 and 15 are energized from the star-connected secondary windings 120, 121 and 122 of the supply-circuit-energized transformers 29, 31 and 30, respectively. Each of the secondary transformer windings is provided with a movable tap 123, all of the taps being connected through a common conductor 124 for a purpose to be set forth.

It will be seen that, by reason of the recited arrangement of circuits, the voltage impressed upon the terminals of the primary winding 90 of the induction motor 23, constituting a part of the master relay device, may be varied at will with respect to the supply-circuit voltage by manipulating the operating handle 87 for the secondary winding 86 of the master controller or induction regulator 22. On the other hand, the voltage impressed upon the primary winding 94 of the induction motor 24, comprising the remaining part of the master relay device, is proportional to, and varies with, the total load or sum of the average loads upon the several driving units or induction motors M1 to M4, inclusive. By suitably adjusting the master controller 22, the total motor load, thus pre-selected, may be thenceforth automatically maintained by the action of the master relay device, by causing the latter to simultaneously govern all of the liquid rheostats LR1, etc. or other resistance-varying devices. Thus, if the total motor load tends to increase, for any reason, the torque of the auxiliary induction motor 24 overcomes that of the opposing supply-circuit-energized induction motor 23 to actuate the relay device into such a position that all of the liquid-rheostat-operating mechanisms 20 are caused to lower the liquid level in the respective rheostats and thus reduce the total motor load to the desired values. On the contrary, if the total motor load tends to decrease, the torque of the induction motor 23 predominates to actuate the master-relay device into such a position that the various liquid-rheostat-operating mechanisms are caused to increase the liquid level in the corresponding rheostats and thus increase the total motor load. In the intermediate position illustrated, the opposing motor torques substantially counter-balance each other, and the various liquid rheostats are maintained in whatever position they happen to occupy, since only the corresponding "Off" coils are deënergized, as previously explained.

A similar action occurs in connection with the individual relay devices 25 to 28, inclusive. In each instance, a voltage corresponding to the total motor load and, therefore, to the proportionate load upon each motor, namely, one quarter of the combined load, in the present case, is impressed upon the windings 105 of one of the induction motors constituting the relay device 25, for example, while a voltage corresponding to the actual motor current traversing the primary windings P1, etc. is impressed upon the corresponding primary winding 109 of the allied relay devices 25, etc. Thus, the proportionate or evenly-balanced motor load produces a torque upon the squirrel-cage rotor 106 that is opposed by the torque exerted by the squirrel-cage rotor 108, which is energized in accordance with the actual current traversing the corresponding main motor.

Consequently, under conditions of an even distribution of load between the several motors, the contact members 114 to 117, inclusive, of the respective individual relay devices 25, 26, 27 and 28 remain in the illustrated position to allow movement of the corresponding operating mechanism 20 to gradually reduce the secondary-circuit resistance of the allied motor, but, whenever the actual current traversing the primary windings of the corresponding main motor increases above the above-mentioned proportionate value, the torque exerted by the squirrel-cage rotor 108 predominates and actuates the relay device 25, etc. into such position that the corresponding operating mechanism is caused to increase the secondary-circuit resistance of the overloaded main motor and thus quickly bring about evenly-balanced load conditions. The remaining individual relay devices 26, 27 and 28 act in a similar capacity with respect to the induction motors M2, M3 and M4.

The function of the movable taps 123 for the various transformers 29, 30 and 31 is to allow a suitable adjustment of the voltages between the auxiliary train-line conductors 13, 14 and 15 in case any main motor is cut out from circuit by reason of injury. For instance, if one of the illustrated motors should be rendered inoperative, the transformer taps 123 should be actuated to vary the voltage impressed upon the auxiliary train-line conductors 13, 14 and 15 to such a degree that the subsequent total load which it is desired to automatically maintain upon the remaining three motors will be of a suitable value to act in conjunction with the various relay devices to effect a proper regulation of the remaining motor circuits, either separately or concurrently.

Referring to Fig. 3, the auxiliary system shown comprises the various liquid-rheostat-governing coils On—1 to Off—4, inclusive, the contact members 96 and 114 to 117, inclusive which are respectively associated with the master relay device and the individual relay devices 25 to 28, inclusive; the auxiliary contact members of the several limit switches L1 to L4, inclusive; the auxiliary switch blade 81 of the line switch 21; and a battery B or other suitable source of energy for exciting the various actuating coils.

Assuming that the line switch 21 occupies the illustrated closed position, the auxiliary circuit is completed from the positive terminal of the battery B through conductor 130, auxiliary switch blade 81 of the line switch 21, conductor 131, contact member 96 of the master relay device, when in its circuit-completing position $r$, and conductor 134, where the circuit divides, the branch corresponding to the induction motor M4 including contact segment 117 of the relay device 28, when in its closed position, actuating coil On—4 and conductor 135 to a junction-point 136. Another circuit includes the contact member 96, and conductor 132, where the circuit divides, the corresponding branch including another contact segment 117, the actuating coil Off—4, auxiliary contact members 137 of the limit switch L4, when in its low-current position, and conductor 138 to the junction-point 136, whence a common circuit is completed through conductors 139 and 140 to the negative terminal of the battery B. Similar circuits for the remaining liquid rheostats are illustrated but need not be further described.

It will be observed that, when the contact segment 96 of the master relay device occupies the described position $r$, the common energizing circuit for the several liquid-rheostat governing coils is closed, and the operation of the rheostats is dependent upon the individual controlling circuits. Whenever the contact segment 96 occupies its mid-position $h$, the various "Off" coils are deënergized and, consequently, the several liquid rheostats will remain in whatever position they happen to occupy unless the individual governing circuits effect different operation. Finally, if the contact segment 96 occupies its fully open position $l$, all of the actuating coils for the several liquid rheostats are simultaneously deënergized, and return movements of the various operating mechanisms are simultaneously effected to immediately reduce the load upon all of the motors until the master relay device again actuates the contact segment 96 into either its intermediate or its circuit-closing position.

Likewise, whenever the contact segment 117, for example, interrupts the circuits including conductors 132 and 134 by reason of the previously-described operation of the relay device 28, the actuating coils On—4 and Off—4 are simultaneously deenergized to produce a backward movement of the corresponding liquid-rheostat mechanism and, therefore, a reduction of the corresponding motor load. The function of the limit switch L4, for instance, is the usual one of interrupting the circuit of the coil Off—4 and thus causing the allied liquid rheostat to hold a certain position until the corresponding motor current has decreased to the desired value.

It will be appreciated that, if desired, the master controller or induction regulator 22 may be so designed that its maximum delivered voltage corresponds to the maximum permissible total current in the induction motors, whereby, under such conditions, the master relay device will operate to simultaneously reduce the motor loads in the manner previously described, and the use of limit switches L1 to L4 may thus be eliminated, if deemed advisable.

Figure 4:
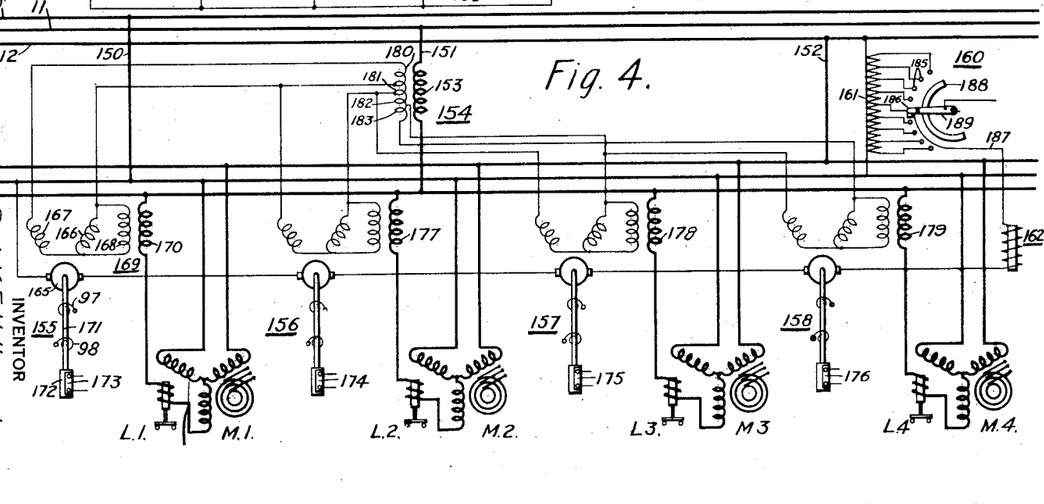
Fig. 4 and Fig. 5 are diagrammatic views, corresponding, respectively, to Fig. 2 and Fig. 3, of a modification of the present invention.

Reference may now be had to Fig. 4, wherein the system shown comprises the main supply-circuit conductors 10, 11 and 12; the main bus-bars 16, 17 and 18; the induction motors or other driving units M1 to M4, inclusive; conductors 150, 151 and 152 for connecting the supply-circuit conductors 10, 11 and 12 to the main bus-bars 17, 18 and 16, respectively, a primary winding 153 of a transformer 154 being included in the conductor 151; a plurality of motor-type relay devices 155, 156, 157 and 158; a master controller or regulator 160 for connecting variable amounts of a supply-circuit-energized transformer winding 161 in circuit; and an inductive or impedance device 162, such as an iron-core induction coil for modifying certain phase relations of the various relay devices.

The relay devices are associated with the respective motors for separately balancing the loads thereof and, inasmuch as the devices are identical, only the relay 155 need be described. It comprises a commutator-type armature 165, a main field winding 166 and an auxiliary field winding 167 that are wound to produce excitation of the armature 165 in different directions, as indicated by the non-parallelism of the illustrated windings. A secondary winding 168 of a transformer 169 having its primary winding 170 connected in circuit with the main induction motor M1, is connected across the main field winding 166, whereby the armature 165 is normally energized in accordance with the current traversing the main induction motor M1. The shaft 171 of the armature 165 also carries a small drum controller 172, upon which is mounted a contact segment 173 for governing the actuating coils On—1 and Off—1 of the corresponding liquid rheostat (not shown). The centering springs 97 and 98 are also preferably provided.

The auxiliary field winding 167 is connected, through the main field winding 166, across a proportionate part 180 (in this case, one quarter, since there are four motors) of the secondary winding of the total-current-energized transformer 154. The connection and arrangement of parts are such that the voltages of the secondary winding 168 of the single-motor-current-energized transformer 169 and of the proportionate part 180 of the total-current-energized transformer 154 normally neutralize each other with respect to the auxiliary field winding 167; that is to say, under conditions of even distribution of load between the four motors, the voltages in question counteract each other and the auxiliary field winding 167 produces no effect.

Whenever the load in the corresponding motor increases above the proportionate value, however, the auxiliary relay armature 165 is energized from the auxiliary field winding 167, as well as from the main field winding 166, and the total effect of such field-winding energizations, together with the phase-modifying action of the inductive device 162, causes the relay device 155, for example, to move into a position wherein the contact segment 173 opens the circuit governed thereby and causes the operating mechanism 20 for the corresponding liquid rheostat to reduce the motor load and thus restore normal or evenly balanced load-distribution conditions. A corresponding action occurs through the agency of the remaining relay devices 156, 157 and 158 whenever the corresponding motor load tends to increase above the proportionate value, since the field windings corresponding to the auxiliary field winding 167 of the relay device 155 are associated with the secondary windings of series transformers 177, 178 and 179 that are energized by the currents traversing the main motors M2, M3 and M4, respectively, and proportionate parts 181, 182 and 183, each equal to the part 180 of the secondary winding of the total-current-energized transformer 154, are differentially connected to the corresponding auxiliary field windings under consideration. Coöperating contact members 174, 175 and 176, corresponding to the contact members 173 of the relay device 155, are provided upon the relay devices 156, 157 and 158, respectively.

The regulating transformer 161 is provided with a plurality of taps 185 which are successively engaged by a movable contact member 186 of the master controller 160, whereby the voltage impressed upon the auxiliary relay armatures 165 is varied, at will, through a circuit including supply-circuit conductor 12, any selected portion of the transformer winding 161, a tap 185, movable contact member 186 of the master controller, conductor 187, the inductive or impedance device 162, the series-related armatures of the relays 158, 157, 156 and 155, train-line conductor 17 and conductor 150 to a second supply-circuit conductor 10.

Assuming that the auxiliary field windings 167 of the various relay devices 155 to 158, inclusive, are inoperative, by reason of the above-described equal distribution of motor loads, the automatic maintenance of a substantially constant total motor current is effected as follows: Whenever the product of the currents traversing the main field windings 166 of the various relay devices and the armatures 165 thereof attains a predetermined value, the torque produced serves to rotate the contact members 173, 174, 175 and 176 of the several relay devices into open-circuit positions, whereby the corresponding liquid-rheostat-governing coils are deënergized to produce backward movement of the liquid rheostat and thus decrease the total motor load. Consequently, the total motor current may be automatically maintained at any value dependent upon the previous manual adjustment of the master controller 160.

The separate control of the individual liquid rheostats to automatically maintain an even distribution of load among the several motors has already been described. In this connection, the auxiliary field windings 167 of the relay devices should exert a relatively powerful effect, as compared with the main field winding 166, whereby even a slight unbalancing of the motor load is sufficient to cause the relay of the overloaded motor to act.

Figure 5:
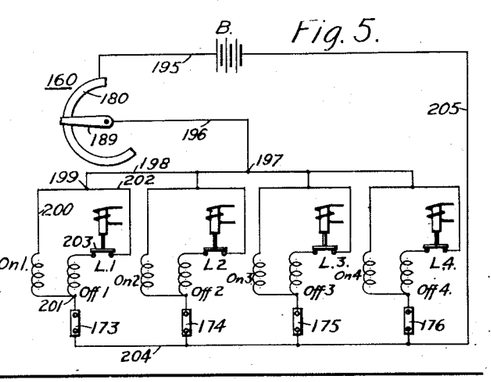

Referring to the auxiliary circuits of Fig. 5, the governing system partially shown comprises the various actuating coils ON—1 to Off—4, inclusive, the contact segments 173 to 176, inclusive, of the relay devices 155 to 158, inclusive; the contact members of the various limit switches L1 to L4, inclusive; a portion of the master controller 160; and a battery B or other suitable source of energy.

Assuming that the master controller 160 occupies any operative position, as illustrated in Fig. 4, an auxiliary circuit is established from the positive terminal of the battery B through conductor 195, contact segment 188 and auxiliary movable contact member 189 of the master controller, and conductor 196 to junction-point 197, where the circuit divides, one branch including conductor 198 and a second junction-point 199, where the circuit further divides, one branch including conductor 200 and the actuating coil On—1 to a third junction-point 201, and the other further branch including conductor 202, coöperating contact members 203 of the limit switch L1 and the actuating coil Off—1 to the junction-point 201, whence a common circuit is completed through contact member 173 of the relay device 155, when in its circuit-closing position, and conductors 204 and 205 to the negative battery terminal.

Similar circuits, which need not be traced here, are completed for the other liquid-rheostat-operating mechanisms. The limit switches L1 to L4, inclusive, perform functions similar to those described in connection with Fig. 3.

It will be observed that, whenever any one of the contact segments 173 to 176, inclusive, is actuated to interrupt the circuit governed thereby, the actuating coils of the corresponding liquid rheostat are both deënergized, and a return movement of the operating mechanism occurs to effect a predetermined decrease of the corresponding motor current.

It should be observed that an important advantage of the above-described systems over the prior art systems of which I have knowledge resides in the fact that the individual motor loads are automatically balanced at all times, irrespective of the total motor load. In other words, the regulating action of the individual motor relays is independent of the setting or action of the master relay device. For example, when a light-weight train has reached full speed, the combined load may be less than that corresponding to the setting of the master relay, but the individual relays fulfil their intended regulating function just as well as during the accelerating period, since the proper proportionate value of the total load, of whatever amount, is counterbalanced against the actual load in each motor, as previously described in detail.

In order to prevent "slippage" conditions of any set of vehicle wheels and of the corresponding motor, some form of automatic device dependent, for example, upon the slip frequency of the secondary windings of the main motors, should be employed. For this purpose, I preferably employ one of the systems set forth in my co-pending application, Serial No. 70,437, filed January 5, 1916. By the use of such a slippage-preventing system in combination with the present invention, the desired automatic maintenance of the total motor load, the balancing of load between the several driving units and the prevention of wheel-slippage conditions is effected.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit, of a plurality of driving units energized therefrom to haul a common load, and a relay device having actuating members opposingly energized from said supply circuit and said driving units for adjusting the total load upon said units.

2. In a system of control, the combination with a supply circuit, of a plurality of driving units energized therefrom to haul a common load, and a relay device embodying mechanically-joined actuating motors opposingly energized from said supply circuit and said driving units for fixing the total electrical load upon said units.

3. In a system of control, the combination with a supply circuit, of a plurality of driving units energized therefrom to haul a common load, means for manually fixing the total load upon said units, and a relay device embodying mechanically-joined actuating motors opposingly energized from said supply circuit and said driving units for automatically maintaining said manually fixed load.

4. In a system of control, the combination with a supply circuit, of a plurality of driving induction motors energized therefrom to haul a common load and each having a primary and a secondary winding, individual means for varying the resistance of the several secondary-winding circuits, means acting in accordance with predetermined relative supply-circuit and motor conditions for controlling all of said individual means to determine the total electrical load upon said motors, and means associated with said last means for separately controlling said individual means to evenly distribute the load between the several motors.

5. In a system of control, the combination with a supply circuit, of a plurality of driving induction motors energized therefrom to haul a common load and each having a primary and a secondary winding, individual means for varying the resistance of the several secondary winding circuits, means differentially energized by predetermined supply-circuit and driving-unit conditions for controlling all of said individual means to adjust the total load upon said motors, and means electrically associated with said last means for separately controlling said individual means to evenly distribute the load between the several motors.

6. In a system of control, the combination with a supply circuit, of a plurality of main induction motors energized therefrom to haul a common load and each having a primary and a secondary winding, individual means for varying the resistance of the several secondary-winding circuits, a master relay device embodying mechanically-joined actuating motors opposingly energized from said supply circuit and said main motors for controlling all of said individual means to fix the total load upon said main motors, and other relay devices associated with the respective main motors and each comprising actuating members opposingly energized from certain circuits of the respective main motors and from certain circuits of said master relay device for separately controlling said individual means to balance the load between the several main motors.

7. In a system of control, the combination with a supply circuit, of a plurality of main induction motors energized therefrom to haul a common load and each having a primary and a secondary winding, individual means for varying the resistance of the several secondary-winding circuits, a master relay device embodying mechanically-joined actuating motors opposingly energized from said supply circuit and said main motors for controlling all of said individual means to fix the total load upon said main motors, and other relay devices each comprising mechanically-joined actuating motors opposingly energized in accordance with the proportionate main-motor current and the corresponding actual main-motor current for separately controlling said individual means to balance the load between the several main motors.

8. In a system of control, the combination with a supply circuit, of a plurality of driving induction motors energized therefrom to haul a common load and each having a primary and a secondary winding, individual means for varying the resistance of the several secondary-winding circuits, means for pre-selecting the total electrical load upon the motors, means energized in accordance with predetermined relative supply-circuit and motor conditions for controlling all of said individual means to automatically maintain the selected load, and means associated with said last means for separately controlling said individual means to evenly and automatically distribute the load between the several motors.

9. In a system of control, the combination with a supply circuit, of a plurality of driving induction motors energized therefrom to haul a common load and each having a primary and a secondary winding, individual means for varying the resistance of the several secondary-winding circuits, means for manually fixing the total load upon said motors, a master relay device embodying mechanically-joined actuating motors opposingly energized from said supply circuit and said driving motors for controlling all of said individual means to automatically maintain said fixed load, and other relay devices each comprising mechanically-joined actuating motors opposingly energized in accordance with the proportionate driving-motor current and the corresponding actual driving-motor current for separately controlling said individual means to automatically balance the load between the several driving motors.

10. In a system of control, the combination with a supply circuit, of a plurality of main induction motors energized therefrom to haul a common load and each having a primary and a secondary winding, individual means for varying the resistance of the several secondary-winding circuits, a master relay device embodying mechanically-joined actuating motors opposingly energized from said supply circuit and said main motors for controlling all of said individual means, other relay devices each comprising mechanically-joined actuating motors opposingly energized in accordance with the proportionate main-motor current and the corresponding actual main-motor current, and an induction regulator for adjusting the voltage applied from the supply-circuit to said master relay device.

11. In a system of control, the combination with a supply circuit, of a plurality of dynamo-electric machines energized therefrom to haul a common load, individual means for varying the load conditions of the respective machines, means acting in accordance with predetermined relative supply-circuit and machine conditions for controlling all of said individual means to determine the total machine load, and means for independently controlling said individual means to balance the machine loads irrespective of total-load conditions.

12. In a system of control, the combination with a supply circuit, of a plurality of motors energized therefrom to haul a common load, individual means for varying the load conditions of the respective machines, a master relay device acting in accordance with predetermined relative supply-circuit and machine conditions for controlling all of said individual means to determine the total motor load, and independent relay devices for controlling said individual means to evenly distribute the motor loads irrespective of total-load conditions.

13. In a system of control, the combination with a supply circuit, of a plurality of driving units energized therefrom to haul a common load, relay means acting in accordance with predetermined relative supply-circuit and driving-unit conditions for adjusting the total load, and independent means for maintaining balanced load conditions between the several driving units.

14. In a system of control, the combination with a supply circuit, of a plurality of driving units energized therefrom to haul a common load, means for automatically adjusting the total load upon said units, and means for simultaneously maintaining balanced conditions between units irrespective of the total load.

15. In a system of control, the combination with a supply circuit, of a plurality of induction motors energized therefrom to haul a common load and each having a primary and a secondary winding, means for respectively varying the resistance of the several secondary-winding circuits, relay means having elements opposingly energized from said supply circuit and said motors for controlling all of said resistance-varying means, other relay means having elements opposingly energized in accordance with the proportionate motor current and the corresponding actual motor current, and means for adjusting the voltage applied from the supply circuit to the first-named relay means.

16. In a system of control, the combination with a supply circuit, of a plurality of induction motors energized therefrom to haul a common load and each having a primary and a secondary winding, means for respectively varying the resistance of the several secondary-winding circuits, relay means having elements opposingly energized from said supply circuit and said motors for controlling all of said resistance-varying means to fix the total load upon said motors, and other relay means associated with the respective motors and each comprising elements opposingly energized from certain circuits of the respective motors and from certain circuits of the first-named relay means for separately controlling the resistance-varying means to balance the load between the several motors.

In testimony whereof I have hereunto subscribed my name this 30th day of March, 1917.

RUDOLF E. HELLMUND.